United States Patent [19]

Dischler

[11] Patent Number: 4,913,272

[45] Date of Patent: Apr. 3, 1990

[54] SPINDLE PRESS

[76] Inventor: Helmut Dischler, Droste-Hulshoff Str. 9, 404 Neub, Fed. Rep. of Germany

[21] Appl. No.: 323,063

[22] Filed: Mar. 13, 1989

Related U.S. Application Data

[63] Continuation of Ser. No. 105,958, Oct. 17, 1987, abandoned, which is a continuation of Ser. No. 818,961, Jan. 9, 1986, abandoned, which is a continuation of Ser. No. 564,148, Dec. 22, 1983, abandoned, which is a continuation of Ser. No. 196,704, Oct. 14, 1980, abandoned.

[30] Foreign Application Priority Data

Oct. 11, 1979 [DE] Fed. Rep. of Germany ....... 2941200

[51] Int. Cl.[4] ............................................ F16D 43/286

[52] U.S. Cl. .................................... 192/56 F; 192/150

[58] Field of Search ..................... 192/129 B, 139, 150, 192/85 AA, 56 F

[56] References Cited

U.S. PATENT DOCUMENTS

| | | | |
|---|---|---|---|
| 2,642,971 | 6/1953 | Hagenbook | 192/85 AA |
| 2,696,581 | 12/1954 | Peterson | 192/150 X |
| 3,584,715 | 6/1971 | Miller | 192/56 R |
| 3,608,686 | 9/1971 | Martin et al. | 192/150 |
| 3,769,905 | 11/1973 | Dishcler | 192/105 B X |

FOREIGN PATENT DOCUMENTS

| | | | |
|---|---|---|---|
| 2643534 | 7/1978 | Fed. Rep. of Germany . | |
| 2837253 | 5/1979 | Fed. Rep. of Germany . | |
| 1075027 | 10/1954 | France | 192/85 AA |
| 1009400 | 11/1965 | United Kingdom . | |
| 1337943 | 11/1973 | United Kingdom . | |
| 2012210 | 7/1979 | United Kingdom . | |

*Primary Examiner*—Rodney H. Bonck

*Attorney, Agent, or Firm*—James Creighton Wray

[57] ABSTRACT

A flywheel continuously rotates, A piston within the rotating flywheel presses on a support which in turn presses on a friction clutch to engage the spindle press, whcih causes it to rotate with the flywheel. Upon disengagement, piston pressure is released, the spindle press lags and a part of the support lags with the spindle press, quickly disconnecting pressure on the friction clutch. Thus, the driving connection of the flywheel and spindle press is immediately disengaged from the flywheel without delay otherwise caused by the slowness of return movement of the piston.

17 Claims, 2 Drawing Sheets

FIG. 1
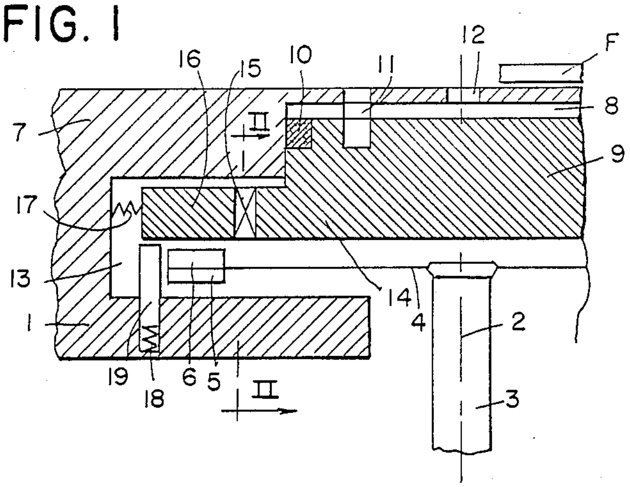
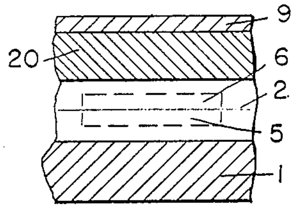
FIG. 2
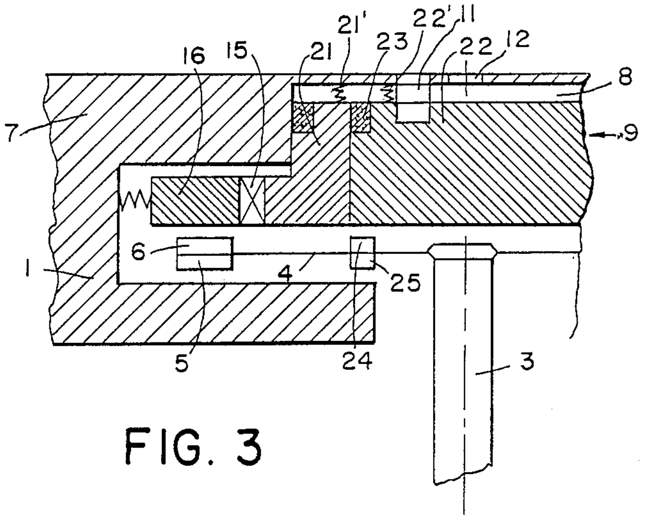
FIG. 3
FIG. 4
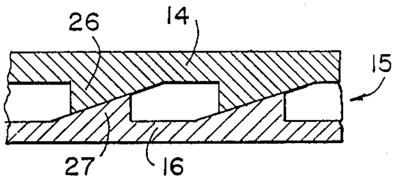
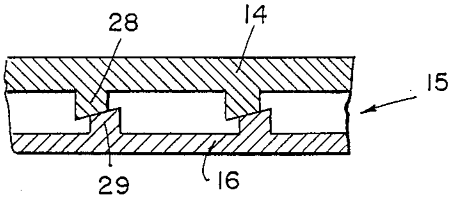
FIG. 5

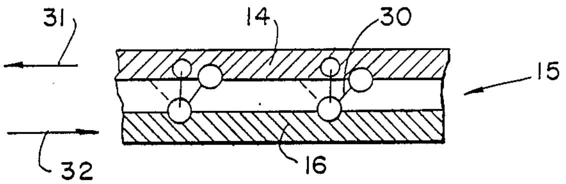
FIG. 6
FIG. 7
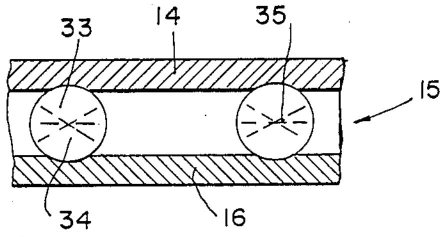
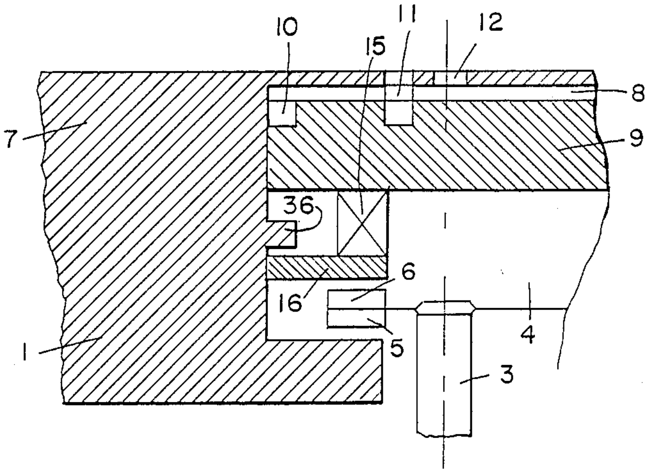
FIG. 8
FIG. 9
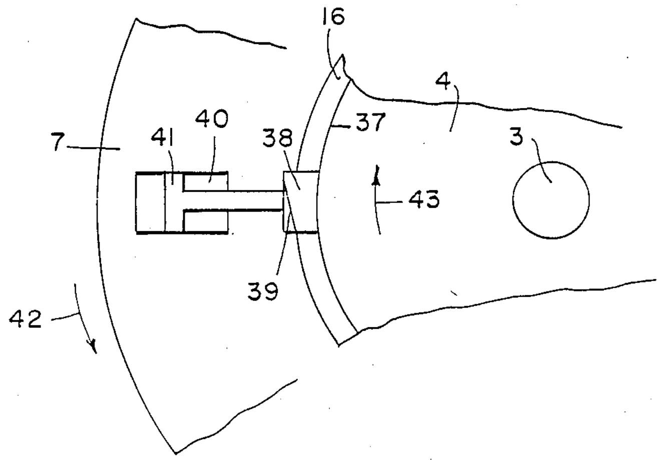

SPINDLE PRESS

This application is a continuation of Ser. No. 105,958, filed 10/17/87, which is a continuation of Ser. No. 818,961, filed 1/9/86, which is a continuation of application Ser. No. 564,148, filed 12/22/83, which is a continuation of Ser. No. 196,704, filed 10/14/80, all now abandoned.

The invention relates to a spindle press having a flywheel continuously turning in the direction of rotation, and a friction clutch, located between the flywheel and a spindle, which opens upon attainment of a predetermined press force under the effect of a control part, reacting to the delay of the spindle.

In a spindle press of the type described in Pat. No. 3,769,905 the friction clutch is activated by compressed air. The supply of compressed air to the pressure chamber is via a central channel protected by a relief valve, connected to which there are branch lines leading to the pressure chamber. The branch lines are also connected with outlets terminating on one face side of the clutch, on which there is a movable mass, acting as a control part, by virtue of the inertia effect towards the spindle. This mass is a disk which is directed at the spindle with a non-reversible thread, and which, moreover, in axial direction is under the effect of a spring. At the end of a working stroke, the rotating motion of the spindle is decelerated, while the disk, because of its inertia, continues to turn.

As a result of the interposed thread, the disk lifts off from the outlets of the pressure chamber, against the effect of the spring, so that the compressed air in the pressure chamber can escape via the outlets.

This in itself has proven effective. The disk quickly lifts off the outlets at the completion of the work stroke. Since, however, the compressed air needs some time, some milliseconds to disengage the clutch, the clutch upon completion of the work stroke may drag. This leads to an undesirable wear of the clutch and results in the press not being fully balanced. Additionally, the effectiveness of this control device for the clutch is dependent upon the ratio of inertia effect to spring effect. These side effects may also appear when disengaging occurs under the influence of an inert mass, which additionally is supported by a spring.

The objective of the invention is to realize a quick clutch disengagement of a spindle press so that the inertial mass of the spindle, bearing of the spindle, and connected clutch parts, does not effect the drag of the clutch upon sudden disengagement of the clutch.

This objective is achieved in that the control part consists of a support device switched into the power path of the clutch between the flywheel and the spindle, whose support effect is deleted upon attaining the desired press force, and upon initiation of relative spindle delay.

Inertia of the control part no longer plays a part in the spindle press of this invention. It can have a very small mass, or theoretically be entirely massless, as the disengagement of the clutch is already controlled with the initiation of the relative movement between the spindle and swing-mass upon completion of the work stroke by the interruption of the power path between flywheel and spindle. This has the advantage that friction wear and tear in the clutch of the press is almost completely eliminated, and, accordingly, increased press performance can be obtained. Moreover, the accuracy of parts manufactured by such a press is greatly improved.

Basically, two working methods can be realized with the spindle press of the invention both of which have in common that the power path between flywheel and spindle is interrupted instantly. On one hand, at the start of the work stroke, the clutch can be engaged with full force and disengaged upon initiation of spindle delay. On the other hand, there is the possibility when engaging the clutch to apply only enough clutch power so that the spindle is adequately accelerated and, then, utilizing the motional energy of the spindle, to increase it to the ultimate value when initiating press power. In this case, spindle delay starts before the clutch is disengaged, as part of the motion energy is utilized for building up the desired clutch power (servo effect).

It would be useful in practical forms of application, if the transferrable torque between the flywheel, or, respectively the axially displaceable piston retained therein, and the support device, are smaller than the torque transferrable between the support device and the spindle. This can be particularly realized when the support device is arranged between a thrust plate, provided with friction facings on both sides and pressable against the flywheel and the piston arranged in the flywheel on one side.

There are several possibilities for practical application. In a preferred variation of the invention the support device has a spacer which is connected to the piston or to the flywheel, and is partially rotatable against the effect of a spring and which, on the clutch side, forms a friction area for the friction facings of the thrust plate. Moreover, on the piston side, it has abutments for support of the support device. When engaging the clutch, the piston and spacer which rotate with the flywheel disk are displaced in the direction of the friction facings of the thrust plate of the spindle, so that as a result thereof, these friction facings are clamped between the flywheel disk and the spacer. In this case, the arrangement of a device, that becomes effective upon closing of the clutch, for maintaining the synchronization as well as for preventing relative axial displacement of the piston and spacer may be necessary. When spindle delay occurs, the support device between piston and spacer interrupts the power path between the flywheel and the spindle as the support device may transfer less torque than the friction clutch between the flywheel and the thrust plate of the spindle. By eliminating the mutual support between the piston and the spacer, these parts may axially and relatively move toward each other, so that the end result is that the contact pressure between the flywheel, friction facings, and spacer is momentarily eliminated.

Support devices may come in differing forms. In a preferred embodiment of the invention, the spacer may have an internal thread which interacts with coordinated external thread of the piston and thereby is supported at the piston. The pitch of the internal thread is arranged in such a way that when spindle delay occurs, the piston is moved away in the direction of the thrust plate, and the spacer is moved away from the friction facings. Pitch and friction ratios of the thread support between the piston and inner ring are adjusted such that the transferrable torque of this thread support is smaller than that of the actual friction clutch.

Different kinds of threads may be used for threaded support, e.g. rectangular or triangular threads. Synchronization of thread pitch and friction ratios, which is analogous to the mechanical term of friction cone, may also be called friction angle, and depends upon the prevailing conditions. A large pitch thread is generally considered advantageous, however, large friction angles are required so that the path between flywheel and spindle is not interrupted before spindle delay occurs. It is to be understood that measures can be taken to improve either the friction angle of the support device (threaded support) and/or the friction ratios of the actual friction clutch. For instance, the thread courses can be provided with wedge grooves or, additionally, friction forces which are derived from the power of the clutch can be increased. On the other hand, it is also possible to insert a multiple disk clutch between spindle and accompanying thrust disk, and between ring or flywheel, respectively. An arrangement whereby several threads are distributed in series onto several thrust disks will multiply the friction effect.

In case of pressure-means-activated clutches, there is the possibility to achieve partial balancing of the pressure chamber in communication with the piston, in such a way that the piston consists of two components coaxial to each other, which are sealed and axially, relatively displaceable to each other. These also jointly form the working surface of the piston, so that the spacer is supported by means of its internal thread at the outer piston, and that the inner piston has a friction surface for additional friction facings, arranged on the thrust plate. Both the outer piston and the inner piston have their own relief spring, whereby the relief spring of the outer piston is stronger than that of the inner piston.

Thus, when engaging the clutch the friction facings of the inner piston become effective first, whereupon, with increased pressure of the pressure means, the friction facings of the outer piston also become effective. When spindle delay starts, the support device arranged between the outer piston and the spacer causes the clutch power effective at the outer piston to be deleted first, while simultaneously, a partial balancing of the pressure chamber occurs, which pressure chamber is then fully balanced in a conventional manner.

In the arrangement of a positive thread pitch in rotational direction of the spindle, between piston and spacer, as well as a switch-off of the piston drive triggered by axial displacement of the piston, specifically by a relief valve working on a pressure-based principle for the pressure chamber of a pressure means activated piston, the effect of the support device can be utilized such that, initially and temporarily, the pressure in the pressure medium chamber is increased. Then the pressure chamber is balanced by displacement of the piston or by opening a corresponding relief valve. Another version of the support device is characterized in that the supports are several hinged supports whose bearing axes are radial at the piston and to the spindle axis. This variation enables, for instance, the working methods initially discussed, in which the engaging of the clutch occurs with reduced clutch power, whereby the supports are at an angle to the spindle axis. Upon initiation of the spindle delay, the hinged supports, or eccentrics, which are in their dead center position extending parallel to the spindle axis, in which position maximum clutch power occurs, are swung into a different position by virtue of the differing rates of revolution of the spindle on one hand, and the flywheel on the other, and clutch power is interrupted.

The supports, however, may also be several two-part balls or rolls between the piston and the spacer whose longitudinal axes essentially are radial to the spindle axis, and which are divided into a longitudinal center plane by formation of gliding surfaces coordinated to each other. Also, the supports may be several wedges arranged at the piston or the spacer, respectively, with wedge surfaces coordinated to each other, and whose wedge surfaces essentially extend towards the periphery. In all cases, the support device works with "inclined planes", whose pitch is either firmly fixed or variable, and whose friction angle is adapted to the prevailing conditions.

Advantageously, the described support devices may be inserted, together with a spacer, which extends in radial direction, between piston and thrust plate, which is arranged in the flywheel, displaceable in axial direction and partially rotatable in peripheral direction against spring action.

It is possible to adjust the ratios of the torques transferred by the assemblies by variation of the diameter on which the support devices on one hand, and the actual friction clutch with the friction facings of the thrust plate, on the other hand, are effected. Favorable conditions, as far as static aspects are concerned, result when the supports essentially are arranged onto the diameter of the friction facings, of the thrust plate.

If there is a support device arranged only on one side of the friction facings of the spindle's thrust plate, then clutch power is instantly interrupted upon initiation of spindle delay on that side; on the opposite side, however, e.g. between friction facings and flywheel, a partial torque may still be transferred, as the friction facings here are still in contact with the coordinated friction areas of the flywheel. If additionally there is an insert of a support device on the opposite side, e.g. the side of the thrust plate facing away from the piston, then this partial torque is also eliminated, and the spindle, by virtue of the "inclined plane" principle of the support devices is provided with a counter-torque. This can be of advantage as it counteracts the dynamic effect and the formation of power peaks inside the press.

It is to be understood that one or several stops may be provided for limiting the movement of the piston in the direction of the spacer. Also, the piston should have a retraction device which may, if appropriate, be coupled with the supports of the support device.

All variations described can be most advantageously implemented with spindle presses having a flywheel which contains a pressure means chamber with inlets and outlets, which houses an axially displaceable piston. However, spindle presses having axially displaceable pistons in the flywheel with an electric control unit, pull magnets or the like, may also effectively utilize the various embodiments of the support device for interruption of power path. When electrical or mechanical piston drives are utilized, an extraordinarily rigid clutch is obtained, which will disengage quickly as it cannot yield to pressure means. In this case, however, should utmost rigidity be desired, the servo effect for increasing clutch power before disengagement must be surrendered. If one does not want to make this compromise, special spring elements have to be provided, which, however, reduce the rigidity of the clutch. Basically, the operation of a mechanical or electro-mechanical clutch is quieter than that of a pressure-means activated clutch. Also, there may be a reduction of manufacturing costs as the preparation of pressure means or the apparatus required therefor are relatively expensive. Moreover, as the consumption of pressure means by a pressure means-operated clutch is considerable, the utilization of an electrical or electro-mechanical clutch may also save energy.

A spindle press working according to the principle outlined above, i.e. without an axially displaceable piston in the flywheel, is characterized by a thrust plate connected to the spindle, which has a friction facing on the peripheral side, and is also characterized by a spacer, which is partially rotatable against spring action and is connected to the flywheel, carrying wedge-shaped supports pressable against the periphery of the thrust plate in peripheral direction. These supports have friction facings on the inside and outside, whereby each support has coordinated press dies arranged in the flywheel, whose outer surfaces have friction facings adapted to the outside of the support. Here again, "inclined planes" are realized, which in the sense described above become effective. The press dies may be arranged here at the piston rod ends of pistons carried in the pressure cylinders, in essentially radial direction.

Examples of the invention are depicted by way of the following drawings, in which:

FIG. 1 is a schematic and partial cross-sectional view through the clutch of a spindle press.

FIG. 2 is a cross section through the subject of FIG. 1 along line II—II.

FIG. 3 is another version of the subject according to FIG. 1.

FIGS. 4, 5, 6, 7 show various examples of connecting device which are depicted in radial view.

FIG. 8 shows yet another version of the subject according to FIG. 1.

FIG. 9 depicts schematic, and partially a top view of another clutch of a spindle press.

The clutch depicted in the drawings is part of a spindle press not shown in full detail, with a frame F which has a driven flywheel 1, always rotating in the same direction. The rotational axis of flywheel 1 is simultaneously axis 2 of spindle 3, to which there are connected, for instance, movable tools via a spindle nut. Spindle 3 at its upper end has thrust plate 4, which at its outer edge has friction facings 5 and 6, at the upper and lower sides, respectively.

Adjacent to the top of flywheel 1 there is housing 7 which encloses cylindrical pressure chamber 8 for a piston 9 which is axially displaceable therein. Peripheral seal 10 seals piston 9 in pressure chamber 8. Piston 9 is held in housing 7 with one or more pins 11, which serve as an anti-twist safety device and prevent turning while remaining axially displaceable. One or more openings 12 to pressure chamber 8 having valves, which are not depicted, serve an inlet and outlet for the pressure medium.

Pressure chamber 8 at its lower portion also becomes cylindrical free space 13 into which adjacent ring flange 14 extends below piston 9. At the periphery of ring flange 14 there is connected spacer 16 via support device 15, which spacer is axially displaceable and partially rotatable against the effect of a spring 17, and is housed in free space 13. One of several plungers 19 are extended in axial direction, and supported by springs 18 to form yielding thrusts for spacer 16 upon closing of the clutch. The function of these plungers will be explained in full detail later on.

In the example of FIGS. 1 and 2, support device 15 consists of an internal thread of spacer 16 and an external thread 20 coordinated thereto at the periphery of ring flange 14, so that spacer 16 supports itself by means of the thread on ring flange 14. The thread depicted is a rectangular thread which is arranged on a diameter which is smaller than the diameter of friction facings 5 or 6 and their coordinated friction areas on flywheel 1 and spacer 16. The thread pitch of support 15 and its friction ratios are such that the transferrable torque between flywheel or axially displaceable piston 9, held therein in without relative rotation manner by means of one or more pins 11, and the support device 15 is smaller than the torque between support device 15 and spindle 3, or thrust plate 4, respectively. Basically, the thread pitch is such that at a spindle delay, piston 9 is moved in a direction towards spindle 3, while spacer 16 is moved in the opposite direction.

The introduction of the pressure medium into pressure chamber 8 serves to engage the clutch, so that piston 9, together with spacer 16, moves in the direction of spindle 3. In order to avoid a relative displacement between piston 9 and spacer 16, when the clutch is engaged, plungers 19 are provided against which the underside of spacer 16 positions itself. Flywheel 1, housing 7, piston 9 and spacer 16 rotate together. Plungers 19, which are mounted in flywheel 1, turn with the flywheel. As the plunger-supporting springs 18 are compressed by actuation of the piston and spacer 16, as the spacer applies rotational force on clutch ring 6 of spindle plate 4, the plungers keep spacer 16 rotating with the flywheel. Piston 9 and spacer 16 are displaced in axial direction until thrust plate 4 or its friction facings 5, 6, respectively, are gripped between flywheel and spacer 16, and spindle 3 is carried along by flywheel 1.

Upon attaining compression strength spindle 3 is delayed. In this way, thrust plate 4 and spacer 16 are likewise delayed, as the torque transferrable between piston 9 and spacer 16 is smaller than that existing between flywheel 1, friction facings 5, 6, and spacer 16.

The relative rotation between piston 9 and spacer 16 has the effect that while pressure chamber 8 is discharging, piston 9 continues to be moved in axial direction towards the spindle, while simultaneously spacer 16 is moved in the opposite direction, so that the power path in the clutch is interrupted instantly.

After discharge of the pressure medium, which may be during press withdrawal, spacer 16 also is returned to its starting position under the effects of springs 17, 18. It is to be understood that a return device, not depicted, may be provided at piston 9, which, if necessary, may be controlled by support device 15.

Instead of rectangular thread, a triangular thread may be used, in which according to the wedge effect, greater friction forces become effective. Utilization of a multiple disk clutch facilitates changes in the friction ratio, especially an increase of the torques transferred by friction. Moreover, the ratio of the transferrable torques between piston 9 and spacer 16, as well as those between flywheel 1, thrust plate 4 and spacer 16, may be changed by variation of the diameters of support device 15 and/or the diameters of friction facings 5,6.

In all variations, it is important that the self-locking effect of spacer 16, when considering thread pitch and friction ratios, is great enough that the clutch force does not immediately lead to the disengagement of the clutch, but that the clutch is only disengaged upon spindle delay.

In the example depicted in FIG. 3, identical reference numerals refer to identical parts. In this example, piston 9 consists of an outer piston 21 and an inner piston 22, arranged therein in a concentric manner. A peripheral seal 23 seals inner 22 against outer piston 21. The two piston parts jointly form a common working area towards pressure chamber 8. Outer piston 21 and inner piston 22 are connected, respectively, to separate release springs 21' and 22', not depicted. The release spring of outer piston 21 is stronger than the release spring of inner piston 22.

Thrust plate 4, in addition to friction facings 5, 6, has additional friction facings 24, 25 in the displacement area of inner piston 22, which friction facings have coordinated friction facings at inner piston 22 and at flywheel 1.

Upon admission of pressure to pressure chamber 8, inner piston 22, as a result of the weaker release spring, initially is axially displaced in the direction toward spindle 3 until friction facings 24, 25 are gripped between inner piston 22 and flywheel 1. Somewhat later, outer piston 21 is axially displaced with spacer 16 until the friction facings 5,6 are gripped between flywheel 1 and spacer 16.

Upon initiation of spindle delay, according to the example depicted in FIG. 3, the power path between flywheel 1, spacer 16 and friction facings 5,6 is interrupted, whereby a partial balancing of the pressure chamber occurs, as outer piston 21, as well as inner piston 22 are operated by the same pressure medium. Subsequently, the pressure chamber can be fully balanced. In this example, the arrangement of plungers 19 for maintaining the synchronization as well as for preventing a relative axial displacement of outer piston 21 and spacer 16 can be dispensed with.

In FIGS. 4–7, several variations of support device 15 are depicted. In the version depicted in FIG. 4, support device 15 has wedges 26, 27 instead of threads. The pitch of the wedge surfaces, and the friction ratios attained therewith, are to be interpreted according to the same principles as above, relating to the thread design of support device 15.

As can be seen from FIG. 5, the wedge areas can also be at tooth-like protruding shoulders 28, 29, so that subsequent to a limited relative displacement between ring flange 14 of piston 9 or outer piston 21, respectively, and spacer 16, an axial support force is instantly eliminated, thereby instantly deleting the support effect of support device 15.

Support device 15 depicted in FIG. 6 has several hinged supports 30 between ring flange 14 and spacer 16. Hinged supports 30 are arranged in a suitable manner, at these components, so that they are swivelable at a relative rotation. Possible swivel positions of hinged supports 30 are indicated in FIG. 6 by a dotted line.

If one assumes that flywheel 1, together with piston 9 and ring flange 14 is turning in the direction of arrow 31, then less than full clutch power is required to engage the clutch, as support device 15, in the swivel position of the hinged supports depicted with a solid line, can transfer sufficiently large torques. Upon initiation of spindle delay, spindle 3 with thrust plate 4 and spacer 16, coupled therein, performs a relative rotation indicated by arrow 32 towards ring flange 14. In this way, hinged supports 30 are tilted into a vertical position by increasing the transferred torque and subsequently are moved into the opposite swivel position (indicated by dotted line) in which no torque from flywheel 1 is transferred onto the spindle. Rather, while changing from the dotted line vertical position to the dotted-line swivel position, spindle delay is further enhanced.

In a variation of support device 15, depicted in FIG. 7, the device has two-part balls or rolls 33,34 between ring flange 14 and spacer 16.

Two-part balls 33,34 are arranged in suitable manner at these components and support each other via coordinated gliding surfaces 35. Upon initiation of spindle delay and inherent relative rotation between axial ring flange 14 and spacer 16, gliding surfaces 35 act as wedge surfaces in a manner described above.

In all variations, it is possible to apply the support device functionally in such a way that it activates either clutch engagement or a drive for the return of piston 9 and/or causes balancing of pressure chamber 8.

Again, in the examples depicted in FIG. 8, identical reference numerals refer to identical parts. Contrary to the example of FIG. 1, spacer 16 is arranged below piston 9 and extends in radial direction between piston 9 and thrust plate 4. Moreover, as described above, spacer 16 is partially rotatable against spring action and is arranged in housing 7 in axially displaceable manner. Between piston 9 and spacer 16, there is support device 15. Abutments 36 form stops for limiting the movement of piston 9 in the direction towards spacer 16.

With a view to static power transfer, this variation has a particularly advantageous arrangement, as support device 15 on one side, and friction facings 5, 6 of thrust plate 4 on the other side, are arranged on the same diameter. Otherwise, this clutch operates as described above.

All variations permit a design in which support device 15 is arranged not only between piston 9 and spacer 16, but additionally between flywheel 1 and friction facing 5 of thrust plate 4, whereby, if necessary, thrust plate 4 may be a multiple disk clutch. The arrangement of two support devices on both sides of spacer 16 has the advantage that upon attainment of the desired press force, and upon initiation of the relative spindle delay, the support effect of support device 15 can be dispensed with on both sides of the friction clutch, and no residual friction remains. Thereupon, torques induced by support device 15, supporting the delay of spindle 3, can be fully effective.

In the drawings, the clutches depicted are always clutches with pressure-means activated pistons. The piston may, however, also be electrically or electromechanically activated and thereby may be moved in the direction of spindle 3. This facilitates a clutch design of greater rigidity, which is quieter than the clutch activated by pressure means.

The example given in FIG. 9 eliminates a piston altogether. In this version, thrust plate 4 has friction facings 37 at the periphery. Spacer 16, located in housing 7, of flywheel 1, partially rotatable against spring action, has axially protruding supports 38, which have radial inner and outer friction facings. These supports 38 with their radial inner friction facings may be pressed against the peripheral friction facing 37 of thrust plate 4. Supports 38 are wedge-shaped. Press dies 39 have outer surface friction facings adapted to coordinate to support 38, and serve for pressing supports 38 against thrust plate 4. Each press die 39 is arranged at the piston rod end of piston 41 carried in chamber cylinder 40. Pressure cylinders 40 are housed in casing 7 of flywheel 1. The positive direction of pistons 41 is essentially radial. Pressure cylinders 40 have inlets and outlets, not depicted, on the piston rod-free side of piston 41, for pressure media.

In this variation also, the wedge-shaped surfaces of supports 38 facing press dies 39, and the friction ratios between supports 38 and press dies 39, are arranged in such a way that upon engaging the clutch by admission of pressure medium into cylinder 40, thrust plate 4, and inherently spindle 3, are carried along by flywheel 1 in the direction of arrow 42.

Once spindle delay is initiated, and there is relative rotation of thrust plate 4 in the direction of arrow 43, supports 38 on spacer 16 and pressure dies 39 are displaced from each other, so that the power path between flywheel 1 and spindle 3 is interrupted.

I claim:

1. A clutch for a spindle press having a flywheel and spindle, comprising, a driven flywheel and the flywheel always rotates in the same direction, a rotational axis of the flywheel, wherein the axis is simultaneously an axis of the spindle, a thrust plate mounted on an end of the spindle and being rotatable within a space provided in the flywheel, friction pads connected to opposite sides of the thrust plate at upper and lower surfaces of the thrust plate, a piston slideable received in a cylindrical chamber formed in the flywheel and being axially movable above the thrust plate, a housing which encloses the cylindrical chamber for the piston, means for preventing relative rotation between the piston and the flywheel, wherein the piston has a flange extending radially outwardly from an end of the piston facing the thrust plate, a spacer connected to the flange and extending outwardly therefrom through connector means for allowing axial displacement and limited relative rotational movement of the spacer, two friction surfaces opposite the friction pads, one friction surface being an interior surface of the flywheel and the other being a lower surface of the spacer, wherein the piston is drivable under fluid pressure downwardly to engagement of the friction pads with the friction surfaces, and wherein torque transferrable between the piston and spacer through the connector means is smaller than torque transferrable between the friction pads and friction surfaces, whereby a spindle delay results in relative axial movement between the spacer and piston to effect instantaneous clutch release.

2. The clutch of claim 1 wherein the connector means comprises, an internal thread provided in the spacer and an external thread provided on the piston flange, the pitch of the thread being selected to achieve a desired level of transferrable torque between the piston and the spacer.

3. The clutch of claim 2 wherein the threads are rectangular in cross section.

4. The clutch of claim 2 wherein the threads are V-shaped in cross section.

5. The clutch of claim 1 further comprising a spring return, connected to the spacer, for returning the spacer to an initial position after disengagement of the clutch.

6. The clutch of claim 1 wherein the piston comprises an outer piston and an inner piston.

7. The clutch of claim 6 further comprising additional friction pads spaced inwardly from the other friction pads and being aligned with the inner piston, whereby under fluid pressure, the inner piston moves to engage the additional friction pads before engagement of the other friction pads.

8. The clutch of claim 1 wherein the connector means comprise, wedge surfaces provided on the outer surface of the piston flange and the inner surface of the spacer, wherein the pitch of the wedge surfaces is selected to achieve a desired transferrable torque between the piston and the spacer.

9. The clutch of claim 1 wherein the connector means comprise, tooth-like protruding shoulders provided on an outer surface of the piston flange and an inner surface of the spacer whereby after limited relative displacement between the piston and the spacer, axial support force of the connector means is instantaneously eliminated.

10. The clutch of claim 1 wherein the connector means comprise, a plurality of hinged supports disposed between the flange and the spacer, wherein the hinge supports swivel under relative rotation between the piston and the spacer.

11. The clutch of claim 1 wherein the connector means comprise, a plurality of two-part balls disposed between the piston flange and the spacer.

12. A clutch for a spindle press having a flywheel and spindle, comprising, a driven flywheel and the flywheel is always rotating in the same direction, a rotational axis of the flywheel, wherein the axis is simultaneously an axis of the spindle, a thrust plate mounted on an end of the spindle and being rotatable within a space provided in the flywheel, friction pads connected to opposite sides of the thrust plate at peripheral edges of the thrust plate, a piston slideably received in a cylindrical chamber formed in the flywheel and being axially movable above the thrust plate, a housing which encloses the cylindrical chamber for the piston, a spacer, connected to the piston by connector means extending downwardly from a lower surface of the piston, two friction surfaces opposite the friction pads, one friction surface being an interior surface of the flywheel and the other being a lower surface of the spacer, wherein the piston is drivable under fluid pressure downwardly to cause engagement of the friction pads with the friction surfaces, and wherein torque transferrable between the piston and the spacer through the connector means is smaller than torque transferrable between the friction pads and friction surfaces, whereby a spindle delay results in relative axial movement between the spacer and the piston to effect instantaneous clutch release.

13. The clutch of claim 12 wherein the friction pads are aligned with the connector means.

14. A clutch for a spindle press having a flywheel and a spindle, comprising, a driven flywheel and the flywheel is always rotating in the same direction, a rotational axis of the flywheel, wherein the axis is simultaneously an axis of the spindle, a thrust plate mounted on an end of the spindle and being rotatable within a space provided in the flywheel, a friction pad connected to a peripheral edge of the a spacer, partially rotatable against spring action, disposed between an inner surface of the flywheel and the peripheral friction pad of the thrust plate, a plurality of protuding supports having radial inner and outer friction pads for frictional engagement with the peripheral friction pad of the thrust plate, wherein the protruding supports are actuated by fluid pressure to engage the thrust plate in order to rotate with the flywheel, whereby spindle delay causes relative displacement between the protruding supports and a plurality of pressure dies so as to interrupt the power path between the flywheel and the spindle.

15. Spindle press apparatus comprising a flywheel, a spindle coaxially mounted with respect to the flywheel, a friction clutch mounted between the flywheel and the spindle, a support means mounted between the friction clutch and at least one of the flywheel and the spindle for transmitting drive with the friction clutch to drive the spindle with the flywheel, which causes the spindle to rotate with the flywheel, and the support means having interrupting means contacting the clutch for driving the spindle with the flywheel and for immediately interrupting and disabling the driving connection of the support means upon spindle delay relative to flywheel rotation.

16. The clutch of claim 15, further comprising: means for preventing relative rotation between the spacer and the piston when the piston is driven downwardly by fluid pressure to effect clutch engagement.

17. The clutch of claim 16, wherein the means for preventing relative rotation comprise at least one plunger, spring biased and extending upwardly from the friction surface of the flywheel.

* * * * *